United States Patent
Ishikawa et al.

(10) Patent No.: US 6,319,980 B1
(45) Date of Patent: Nov. 20, 2001

(54) METHOD FOR PREPARING ORGANIC SILICON COMPOUND EMULSION

(75) Inventors: Hiroki Ishikawa; Atsushi Sakuma; Tsutomu Naganawa; Naohiro Muramoto; Isao Ona, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/421,082

(22) Filed: Oct. 19, 1999

(30) Foreign Application Priority Data

Oct. 29, 1998 (JP) .................................................. 10-307730

(51) Int. Cl.$^7$ .............................. C08L 83/04; C09K 3/18; C09D 5/02; C08K 5/20; C08K 5/41
(52) U.S. Cl. ......................... 524/588; 524/745; 524/747; 524/837; 516/58; 516/59; 528/34; 106/2; 106/287.14
(58) Field of Search ............................ 516/58, 59; 106/2, 106/287.14, 287.16; 524/745, 747, 837, 588; 528/34

(56) References Cited

U.S. PATENT DOCUMENTS

| | | | |
|---|---|---|---|
| 4,567,231 | * | 1/1986 | Huebner et al. ...................... 524/837 |
| 4,648,904 | | 3/1987 | DePasquale et al. ..................... 106/2 |
| 4,877,654 | * | 10/1989 | Wilson ..................................... 106/2 |
| 5,091,002 | * | 2/1992 | Schamberg et al. ..................... 106/2 |
| 5,205,860 | * | 4/1993 | Narula et al. ............................ 106/2 |
| 5,449,712 | * | 9/1995 | Gierke et al. .................. 106/287.14 |
| 5,552,476 | * | 9/1996 | Halling ................................. 524/837 |
| 6,239,211 | * | 5/2001 | Keeping et al. ...................... 524/588 |

FOREIGN PATENT DOCUMENTS 6-313167 * 11/1997 (JP) .

OTHER PUBLICATIONS

Translation of JP 06–313167 to Dow Corning Toray Silicone, PTO–01–1249 (Feb. 2001).*
Derwent Abstract, Week 199222, London : Derwent Publications Ltd., AN–1992–179056, Class A93, JP 04 114979 A(Toyo Ink MFG Co) abstract.
Derwent Abstract, Week 199504, London : Derwent Publications Ltd., AN–1995–027821, Class A93, JP 06313167 A (Dow Corning Toray Silicone) abstract.

* cited by examiner

*Primary Examiner*—Daniel S. Metzmaier
(74) *Attorney, Agent, or Firm*—James L. De Cesare

(57) ABSTRACT

An organic silicon compound emulsion for quickly imparting excellent water-repellent properties to the surfaces of porous inorganic base materials such as concrete, mortar, and masonry. The emulsion is prepared by the steps of emulsifying a mixture consisting of (A) an organoalkoxysilane, (B) an organopolysiloxane having in its molecule at least 2 alkoxy groups or hydroxyl groups bonded to a silicon atom, (C) an anionic emulsifying agent, and (D) water, and heat aging the emulsion at a temperature below 100° C. In another embodiment, the method comprises the steps emulsifying a mixture of the components (A) to (D) and adding an acidic or alkaline substance to the emulsion. In a third embodiment, the method comprises the steps of forming a mixture consisting of the components (A) to (D), adding an acidic or alkaline substance thereto, and performing the emulsification thereafter.

6 Claims, No Drawings

METHOD FOR PREPARING ORGANIC SILICON COMPOUND EMULSION

FIELD OF THE INVENTION

The present invention relates to a method for preparing an organic silicon compound emulsion. More specifically, the invention relates to a method for preparing an organic silicon compound emulsion for quickly imparting excellent water-repellent properties to porous inorganic base materials such as concrete, mortar, and masonry.

BACKGROUND OF THE INVENTION

It is well known that organoalkoxysilanes are useful as water-repellent agents for porous inorganic base materials, i.e., construction materials such as concrete, mortar, and masonry. Such water-repellent agents are normally used in the form of organic solutions prepared by dissolving organoalkoxysilanes in organic solvents. However, the organic solvents used for the above purposes are toxic and easily flammable. Furthermore, since they raise a question of environmental pollution, a need exists for water-repellent agents in the form of water-based emulsions prepared by emulsifying organoalkoxysilanes with the use of water as a diluent.

It has been proposed to use water-repellent agents in the form of emulsion compositions prepared by emulsifying an alkylalkoxysilane with the use of nonionic surfactants having a HYDROPHILE-LIPOPHILE BALANCE (HLB) within the range of 4 to 15. In this regard, reference may be had to Japanese Examined Patent Application (Kokoku) HEI 3-13195/U.S. Pat. No. 4,648,904 issued Mar. 10, 1987. For emulsion compositions prepared by emulsifying an alkylalkoxysilane with the combined use of both nonionic surfactants and anionic surfactants, reference may be had to Japanese Unexamined Patent Application (Kokai) HEI 4-114979.

However, since the alkylalkoxysilane and water are separated from each other over time, the aforementioned compositions are inferior to the organic-solvent type water-repellent agents with regard to their storage properties. Furthermore, when they are applied onto the surfaces of porous inorganic base materials, they cannot impart sufficient water-repellent properties to these surfaces.

It was proposed, therefore, to solve these problems by means of an emulsion composition prepared by emulsifying an organoalkoxysilane and an organopolysiloxane of a specific structure with the use of an anionic emulsifier. In this regard, reference may be had to Japanese Unexamined Patent Application (Kokai) HEI 6-313167. However, this emulsion composition required a significant drying time until the coated surface could reach sufficient water-repellent properties. In addition, the obtained water-repellent properties quickly deteriorated.

BRIEF SUMMARY OF THE INVENTION

It is therefore an object of the present invention to provide a method for preparing an organic silicon compound emulsion capable of quickly imparting excellent surface water-repellent properties to inorganic porous materials such as concrete, mortar, and masonry.

The first embodiment of the present invention provides a method for preparing an organic silicon compound emulsion comprising the steps of:

emulsifying a mixture of the following components:
(A) 100 parts by weight of an organoalkoxysilane represented by the following general formula:

$R^1_a Si(OR^2)_{4-a}$ where $R^1$ represents identical or different monovalent hydrocarbon groups having 1 to 20 carbon atoms, $R^2$ is an alkyl group having 1 to 3 carbon atoms, and a is 1 or 2;
(B) 1 to 200 parts by weight of an organopolysiloxane having in its molecule at least 2 alkoxy groups or hydroxyl groups bonded to a silicon atom;
(C) an anionic emulsifying agent;
(D) water; and
heat aging the obtained emulsion at a temperature below 100° C.

According to the second embodiment, the present invention provides a method for preparing an organic silicon compound emulsion comprising the steps of:

emulsifying a mixture of the following components:
(A) 100 parts by weight of an organoalkoxysilane represented by the following general formula:

$R^1_a Si(OR^2)_{4-a}$ where $R^1$ represents identical or different monovalent hydrocarbon groups having 1 to 20 carbon atoms, $R^2$ is an alkyl group having 1 to 3 carbon atoms, and a is 1 or 2;
(B) 1 to 200 parts by weight of an organopolysiloxane having in its molecule at least 2 alkoxy groups or hydroxyl groups bonded to a silicon atom;
(C) an anionic emulsifying agent;
(D) water; and
adding an acidic or alkaline substance to the obtained emulsion.

According to the third embodiment, the present invention provides a method for preparing an organic silicon compound emulsion comprising the steps of:

mixing the following components:
(A) 100 parts by weight of an organoalkoxysilane represented by the following general formula:

$R^1_a Si(OR^2)_{4-a}$ where $R^1$ represents identical or different monovalent hydrocarbon groups having 1 to 20 carbon atoms, $R^2$ is an alkyl group having 1 to 3 carbon atoms, and a is 1 or 2;
(B) 1 to 200 parts by weight of an organopolysiloxane having in its molecule at least 2 alkoxy groups or hydroxyl groups bonded to a silicon atom;
(C) an anionic emulsifying agent;
(D) water;
adding an acidic or alkaline substance to the obtained mixture; and
emulsifying the mixture.

DETAILED DESCRIPTION OF THE INVENTION

The organoalkoxysilane component (A) suitable for the purposes of the present invention is represented by the following general formula:

$R^1_a Si(OR^2)_{4-a}$

In this formula, $R^1$ represents monovalent hydrocarbon groups having 1 to 20 carbon atoms. These groups may be the same or different. The following are specific examples of such groups: alkyl groups such as methyl group, ethyl group, propyl group, tert-butyl group, pentyl group, n-hexyl group, heptyl group, 2-ethylhexyl group, octyl group, dodecyl group, and octadecyl group; aryl groups such as phenyl group, tolyl group, xylyl group, and naphthyl group; aralkyl groups such as benzyl group and phenethyl group; substituted alkyl groups such as fluoromethyl group, 3,3,3-trifluoropropyl group, 3,3,4,4,5,5,5-heptafluoropentyl group, and difluoromonochloropropyl group. Of these groups, alkyl groups having 4 to 10 carbon atoms are preferred, and alkyl groups having 6 to 10 carbon atoms are particularly preferred. This is because water repellency tends to become inadequate when alkyl chains which are hydrophobic components have less than four carbon atoms.

$R^2$ is an alkyl group having 1 to 3 carbon atoms. Specific examples include methyl groups, ethyl groups, and propyl groups. Of these groups, methyl groups or ethyl groups are preferred, although the ethyl group is most preferred when environmental considerations are taken into account. The subscript a is 1 or 2. One type of organoalkoxysilane (A) may be used alone as this component, or two or more types of organoalkoxysilane (A) may be mixed and used together.

Examples of organoalkoxysilane component (A) include methyltrimethoxysilane, methyltriethoxysilane, ethyltrimethoxysilane, ethyltriethoxysilane, tert-butyltrimethoxysilane, tert-butyltriethoxysilane, n-hexyltrimethoxysilane, n-hexyltriethoxysilane, octyltrimethoxysilane, octyltriethoxysilane, decyltrimethoxysilane, decyltriethoxysilane, dimethyldimethoxysilane, dimethyldiethoxysilane, tert-butylmethyldimethoxysilane, tert-butylmethyldiethoxysilane, n-hexylmethyldimethoxysilane, n-hexylmethyldiethoxysilane, octylmethyldimethoxysilane, octylmethyldiethoxysilane, decylmethyldimethoxysilane, decylmethyldiethoxysilane, phenyltrimethoxysilane, phenyltriethoxysilane, methylphenyldimethoxysilane, methylphenyldiethoxysilane, 3,3,3-trifluoropropyltrimethoxysilane, 3,3,3-trifluoropropyltriethoxysilane, 3,3,3-trifluoropropylmethyldimethoxysilane, and 3,3,3-trifluoropropylmethyldiethoxysilane.

The organopolysiloxane component (B) which is the component designed to improve the emulsification stability of component (A), has at least two hydroxyl groups or alkoxy groups bonded to silicon atoms in each of its molecule. Examples include organopolysiloxanes represented by the general formula

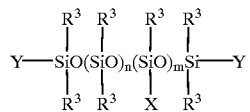

In the formula, $R^3$ is a substituted or unsubstituted monovalent hydrocarbon group. The following are specific examples of such groups: methyl group, ethyl group, propyl group, tert-butyl group, pentyl group, n-hexyl group, heptyl group, 2-ethylhexyl group, octyl group, dodecyl group, octadecyl group, or similar alkyl groups; phenyl group, tolyl group, xylyl group, naphthyl group, or similar aryl groups; benzyl group, phenethyl group, or similar aralkyl groups; fluoromethyl group, 3,3,3-trifluoropropyl group, 3,3,4,4,5, 5,5-heptafluoropentyl group, difluoromonochloropropyl group, or similar substituted alkyl groups. Of these groups, alkyl groups are preferred, and the methyl group is most preferred. In addition, it is not necessary for all of the $R^3$'s in a molecule to be the same, and a combination of two or more types of such groups may be employed if desired. X is a hydroxyl group or alkoxy group. Examples of alkoxy groups include methoxy groups, ethoxy groups, and propoxy groups. Of these groups, hydroxyl groups, methoxy groups, and ethoxy groups are preferred. Y is a group selected from $R^3$ or X. The subscript n is an integer of 1 or greater, and m is a an integer of zero or greater. The sum of m+n is preferably 100 or less, and more preferably 50 or less. This is because when m+n exceeds 100, much of the component remains on the surface of the base material coated with the obtained emulsion, deepening the color of the base material surface, and producing a glossy appearance.

Compounds with the following formulas are examples of organopolysiloxane component (B).

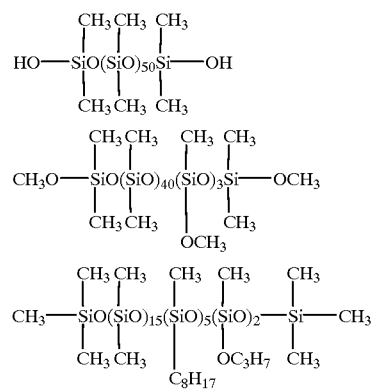

Also effective as component (B) are organopolysiloxanes having in each molecule at least one organic group bonded to a silicon atom and represented by the formula

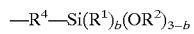

In this formula, $R^1$ and $R^2$ are the same as defined above. $R^4$ is a bivalent hydrocarbon group. The following are specific examples of such groups: ethylene group, n-propylene group, isopropylene group, isobutylene group, and other alkylene groups. Of these, the ethylene group is preferred. The subscript b is 0 or 1. The organopolysiloxane should preferably be linear, but a branched or cyclic organopolysiloxane may also be used. In addition, examples of bonding sites for the organic groups represented by the above formula include the side chains, the ends of the molecular chain, and combinations of the side chains and the ends of the molecular chains. Identical or different types of monovalent hydrocarbon groups are preferred as the groups bonded to silicon atoms, other than the organic groups represented by the above formula. Using combinations of methyl groups and alkyl groups having 4 or more carbon atoms is even more preferred, however. The organopolysiloxanes may be in the form of homopolymers, block copolymers, or random copolymers. The degree of polymerization (DP) is preferably 100 or less, and more preferably the DP is 50 or less. This is because a degree of polymerization in excess of 100 will produce an appearance resembling that of an emulsion-coated surface. Specific examples of these types of organopolysiloxanes are represented by the following formulas.

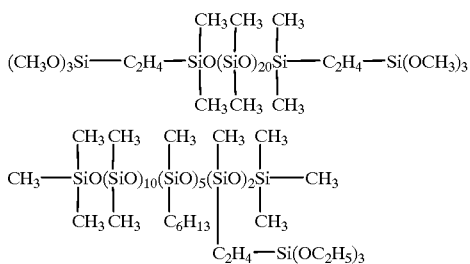

The amount in which this component is admixed should range from 1 to 200 parts by weight, and preferably 10 to 150 parts by weight, per 100 parts by weight of component (A). This is because admixing less than 1 part by weight lowers the stability of the obtained emulsion, whereas admixing more than 200 parts by weight hampers the ability of the base material surface to exhibit its water repellency at an early stage.

The anionic emulsifying agent component (C) is the component designed to emulsify components (A) and (B). Specific examples include octylbenzene sulfonic acid, dodecylbenzene sulfonic acid, cetylbenzene sulfonic acid, and other alkylbenzene sulfonic acids; higher alcohol sulfuric acid esters; polyoxyethylene alkyl ether sulfuric acid esters; polyoxyethylene alkylphenyl ether sulfuric acid esters; and sodium, potassium, lithium, and amine salts of alkylnaphthyl sulfonic acids. The component (C) may be admixed in any amount sufficient for emulsifying components (A) and (B). This amount, while varying with the type of component, is commonly 0.1 to 50 parts by weight, and preferably 0.1 to 10 parts by weight, per 100 parts by weight of the combined amount of the components (A) and (B).

The water component (D) is the dispersion medium for components (A) and (B). Component (D) can be used in any amount that allows the emulsion obtained by the preparation method of the present invention to be an O/W-type emulsion. This amount should, however, be such that the combined concentration of components (A) and (B) constitutes 5–60 percent by weight, preferably 10–50 percent by weight of the total amount of emulsion.

The first preparation method of the present invention comprises emulsifying a mixture composed of components (A) to (D), and heat aging the obtained emulsion at a temperature from 30° C. to below 100° C. The emulsion of components (A) to (D) can be prepared by any conventionally known emulsification method.

Thus, one method is to mix components (A), (B), (C), and (D) with the aid of an impeller, and then emulsify the mixture with the aid of a homomixer, line mill, homogenizer, or other emulsifier device. An alternative method is to emulsify components (A) and (B) with the aid of components (C) and (D), respectively, and then to mix the two emulsions. In any event, after components (A) to (D) have been emulsified, the emulsion is heat aged at less than 100° C., and organoalkoxysilane component (A) is partially hydrolyzed. For such heat aging, conditions corresponding to a temperature of 30–90° C. and a time of 1 hour or longer are preferred. Conditions corresponding to a temperature of 40–60° C. and a time of 1–5 hours are most preferred. This is because of the risk that a temperature below 30° C. will lower the hydrolysis rate of the organoalkoxysilane, whereas a temperature above 100° C. will lead to emulsion breakup.

The second preparation method of the present invention comprises emulsifying a mixture composed of components (A) to (D), adding an acidic or alkaline substance to the obtained emulsion, and partially hydrolyzing organoalkoxysilane component (A). The emulsion of components (A) to (D) can be prepared by any conventionally known emulsification method such as the ones described above. Examples of acidic substances include hydrochloric acid, sulfuric acid, acetic acid, propionic acid, and phosphoric acid. Examples of alkaline substances include alkali metal hydroxides, ammonia, and various amines. The amount of acidic or alkaline substances to be added is not limited, but is typically 0.01 to 5 parts by weight per 100 parts by weight of organoalkoxysilane component (A). This is because of the risk that adding less than 0.01 part by weight will lower the hydrolysis rate of the organoalkoxysilane, whereas adding more than 5 parts by weight will lead to emulsion breakup.

The third preparation method of the present invention comprises forming a mixture of components (A) to (D), adding an acidic or alkaline substance to the mixture, and emulsifying the product. The organoalkoxysilane component (A) is partially hydrolyzed by the addition of the acidic or alkaline substance. Examples of acidic substances include hydrochloric acid, sulfuric acid, acetic acid, propionic acid, and phosphoric acid. Examples of alkaline substances include alkali metal hydroxides, ammonia, and various amines. The amount of acidic or alkaline substance which is added is not limited, but typically is 0.01 to 5 parts by weight per 100 parts by weight of organoalkoxysilane component (A). This is because of the risk that adding less than 0.01 part by weight will lower the hydrolysis rate of the organoalkoxysilane, whereas adding more than 5 parts by weight will lead to emulsion breakup. Emulsification may be performed by the conventionally known emulsification methods described above.

The emulsion of the present invention comprises components (A) to (D), but other conventional components can also be admixed into the emulsion as additives, as long as the object of the present invention is not compromised. Examples of such other additives include nonionic emulsifying agents and pH adjusters. Examples of nonionic emulsifying agents include polyoxyethylene alkyl ethers, polyoxyethylene alkyl phenyl ethers, polyoxyethylene alkyl esters, polyoxyethylene sorbitan alkyl esters, sorbitan alkyl esters, polyethylene glycol, and polypropylene glycol. The addition of such nonionic emulsifying agents can improve the stability of the obtained emulsion. pH adjusters may also be used to adjust the pH. The pH of the emulsion obtained by the preparation method of the present invention is preferably 7 or higher, and is ideally within a range of 7 to 9. This is because the porous inorganic base materials, i.e., construction materials, tend to be degraded by penetration of acidic substances. Examples of pH adjusters include sodium hydroxide, potassium hydroxide, ammonia, various amines, sodium hydrogen carbonate, and sodium oleate. Examples of other additives include organometallic compounds of iron, zinc, titanium, tin, and cobalt; polyester resins and acrylic resins; styrene/butadiene copolymer rubber, natural rubber, and rubber latexes; corrosion inhibitors; preservatives; and coloring agents.

It is also possible to prepare an organic silicon compound emulsion by combining the first and second preparation methods of the present invention, that is, by combining the step of heat aging and the step of adding an acidic or alkaline substance.

Emulsions obtained by the preparation methods of the present invention are advantageous in that when the emulsions are applied for example to a porous inorganic base construction material, the surface of the base material is endowed with an excellent water repellency, and the effect thereof can be demonstrated in a very short time. Another feature of the emulsions are that because the organoalkoxysilane component (A) and the organopolysiloxane component (B) are used together, emulsification occurs more readily, and therefore better stability results than in the case of a composition obtained using only an organoalkoxysilane. This is the reason that emulsions obtained by the preparation method of the present invention are extremely useful as water-repellent agents for concrete, mortar, masonry, and other porous inorganic base construction materials. Such emulsions can be applied to concrete, mortar, and masonry by spraying, roll coating, and brushing methods.

WORKING EXAMPLES

The present invention will now be described in further detail through working examples. In the working examples, the viscosity values are measured at 25° C., and the terms "parts" and "%" refer, respectively, to parts and percent by weight.

Water Repellency of a Surface

Mortar slurry with a cement/sand/water mixing ratio of 1/2/0.6 was laid in a stainless steel framework measuring 100×100×16 mm. The framework was removed 2 days later. The material was subsequently cured for 20 days under conditions corresponding to a temperature of 20° C. and a humidity of 85% yielding a mortar specimen. An organic silicon compound emulsion was applied to the surface of the mortar specimen at a coating weight of 300 g/m². About 0.03 g water was dripped at prescribed time intervals of 30 minutes, 1 hour, 6 hours, and 24 hours, at each of three locations on the surface of the mortar specimen while the coated specimen was dried at room temperature. Changes in the shape of the water droplets were visually evaluated. The results were graded according to the following four levels.

◉: Water droplets remained spherical 10 minutes later; and the surface water repellency was excellent ○: Water droplets disintegrated into hemispheres in 5 minutes; and the surface water repellency was good △: Water droplets disintegrated completely in 3 minutes but had not yet been absorbed by the mortar; and the surface water repellency was fair x: Water droplets absorbed by mortar in 1 minute; and the surface water repellency was poor

Working Example 1

A mixture was prepared from 20 parts n-hexyltriethoxysilane, 10 parts of a dimethyl polysiloxane with a viscosity of 80 mm²/s represented by the formula

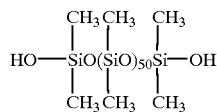

0.5 part polyoxyethylene (2 mol) lauryl ether sodium sulfate, and 69.5 parts deionized water. The mixture was introduced into a homogenizer and treated twice at a pressure of 300 kg/cm², and yielded an emulsion. The emulsion was then heat aged for 4 hours at 50° C. The surface water repellency of the organic silicon compound emulsion thus obtained was measured. The results are shown in Table 1.

Working Example 2

An organic silicon compound emulsion was prepared in the same manner as in Working Example 1, except that 0.25 part N-lauroyl methyl taurine sodium salt was used instead of 0.5 part polyoxyethylene (2 mol) lauryl ether sodium sulfate employed in Working Example 1. The surface water repellency of the obtained emulsion was measured. The results are shown in Table 1.

Working Example 3

A mixture was prepared from 20 parts n-hexyltriethoxysilane, 10 parts of an organopolysiloxane with a viscosity of 25 mm²/s represented by the formula

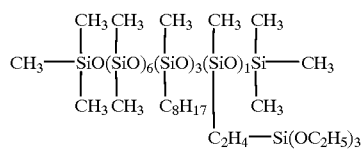

0.5 part polyoxyethylene (2 mol) lauryl ether sodium sulfate, and 69.5 parts deionized water. The mixture was introduced into a homogenizer, treated twice at a pressure of 300 kg/cm², and yielded an emulsion. The emulsion was then heat aged for 4 hours at 50° C. The surface water repellency of the organic silicon compound emulsion thus obtained was measured. The results are shown in Table 1.

Working Example 4

An organic silicon compound emulsion was prepared in the same manner as in Working Example 3, except that 0.25 part N-lauroyl methyl taurine sodium salt was used instead of 0.5 part polyoxyethylene (2 mol) lauryl ether sodium sulfate used in Working Example 3. The surface water repellency of the obtained emulsion was measured. The results are shown in Table 1.

Working Example 5

A mixture was prepared from 20 parts n-hexyltriethoxysilane, 10 parts of an organopolysiloxane with a viscosity of 25 mm²/s represented by the formula

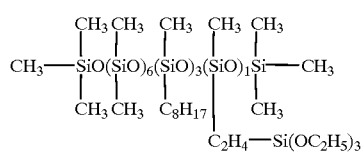

0.5 part polyoxyethylene (2 mol) lauryl ether sodium sulfate, and 59.48 parts deionized water. 0.02 part of acetic acid was then added to the mixture, and the product was introduced into a homogenizer, treated twice at a pressure of 300 kg/cm², and yielded an organic silicon compound emulsion. The organic silicon compound emulsion thus obtained was cured for 4 hours at room temperature, an aqueous solution obtained by dissolving 0.15 part sodium oleate in 10 parts water was added, and the pH of the product was adjusted to 7.2. The surface water repellency of the emulsion was measured. The results are shown in Table 1.

Working Example 6

A mixture was prepared from 20 parts n-hexyltriethoxysilane, 10 parts of an organopolysiloxane with a viscosity of 25 mm²/s represented by the formula

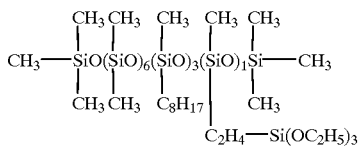
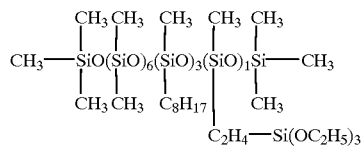

0.5 part polyoxyethylene (2 mol) lauryl ether sodium sulfate, and 59.48 parts deionized water. The mixture was introduced into a homogenizer, treated twice at a pressure of 300 kg/cm², and yielded an emulsion. 0.02 part of acetic acid was then added to the emulsion, the product was cured for 4 hours at room temperature, and an aqueous solution obtained by dissolving 0.15 part sodium oleate in 10 parts of water was added, yielding an organic silicon compound emulsion having a pH of 7.3. The surface water repellency of the emulsion was measured. The results are shown in Table 1.

Comparative Example 1

An organic silicon compound emulsion was prepared in the same manner as in Working Example 1, except that the heat aging that followed the emulsification in Working Example 1 was dispensed with. The surface water repellency of the emulsion was measured. The results are shown in Table 1.

Comparative Example 2

An organic silicon compound emulsion was prepared in the same manner as in Working Example 2, except that the heat aging that followed the emulsification in Working Example 2 was dispensed with. The surface water repellency of the emulsion was measured. The results are shown in Table 1.

Comparative Example 3

An organic silicon compound emulsion was prepared in the same manner as in Working Example 3, except that the heat aging that followed the emulsification in Working Example 3 was dispensed with. The surface water repellency of the emulsion was measured. The results are shown in Table 1.

Comparative Example 4

An organic silicon compound emulsion was prepared in the same manner as in Working Example 4, except that the heat aging that followed the emulsification in Working Example 4 was dispensed with. The surface water repellency of the emulsion was measured. The results are shown in Table 1.

Comparative Example 5

A mixture was prepared from 20 parts n-hexyltriethoxysilane, 10 parts of an organopolysiloxane with a viscosity of 25 mm²/s represented by the formula 0.5 part polyoxyethylene (2 mol) lauryl ether sodium sulfate, and 59.5 parts deionized water. The mixture was introduced into a homogenizer, treated twice at a pressure of 300 kg/cm², and yielded an emulsion. An aqueous solution obtained by dissolving 0.05 part sodium oleate in 10 parts water was subsequently added to the emulsion, yielding an organic silicon compound emulsion having a pH of 8.2. The surface water repellency of the emulsion was measured. The results are shown in Table 1.

Comparative Example 6

A mixture was prepared from 30 parts n-hexyltriethoxysilane, 2 parts polyoxyethylene (2 mol) lauryl ether, and 68 parts deionized water. The mixture was introduced into a homogenizer, treated twice at a pressure of 300 kg/cm², and yielded an emulsion. The emulsion was then heat aged for 4 hours at 50° C. but had inadequate stability because oil floated to the surface of the emulsion during curing.

TABLE 1

| | | Surface water repellency | | | |
|---|---|---|---|---|---|
| | Elapsed time | 30 min | 1 hour | 6 hours | 24 hours |
| Present invention | Working Example 1 | ◎ | ◎ | ◎ | ◎ |
| | Working Example 2 | ◎ | ◎ | ◎ | ◎ |
| | Working Example 3 | ◎ | ◎ | ◎ | ◎ |
| | Working Example 4 | ◎ | ◎ | ◎ | ◎ |
| | Working Example 5 | ◎ | ◎ | ◎ | ◎ |
| | Working Example 6 | ◎ | ◎ | ◎ | ◎ |
| Comparative examples | Comparative Example 1 | x | x | Δ | ○ |
| | Comparative Example 2 | x | x | Δ | ○ |
| | Comparative Example 3 | x | x | Δ | ○ |
| | Comparative Example 4 | x | x | Δ | ○ |
| | Comparative Example 5 | x | x | Δ | ○ |

Thus, it can be seen that the first method for preparing an organic silicon compound emulsion in accordance with the present invention comprises performing heat aging following emulsification of components (A) to (D); the second preparation method comprises adding an acidic or alkaline substance following emulsification of components (A) to (D); and the third preparation method comprises performing emulsification following addition of an acidic or alkaline substance to a mixture of components (A) to (D). Emulsions obtained by these three methods are advantageous in that excellent water repellency can be imparted to surfaces of porous inorganic base materials at an early stage.

What is claimed is:

1. A method of preparing an organic silicone compound emulsion comprising:
   (i) emulsifying a mixture of:
      (A) 100 parts by weight of an organoalkoxysilane of the formula $R^1_a Si(OR^2)_{4-a}$ where $R^1$ is an identical or different monovalent hydrocarbon group having 1–20 carbon atoms, $R^2$ is an alkyl group having 1–3 carbon atoms, and a is 1 or 2;
   (B) 1–200 parts by weight of an organopolysiloxane having in its molecule at least two alkoxy groups or hydroxyl groups bonded to silicon atoms;
   (C) an anionic emulsifying agent; and
   (D) water; and
(ii) adding 0.01 to 5 parts by weight per 100 parts by weight of component (A) of an acid to the emulsion and hydrolyzing the organoalkoxysilane (A); the acid being selected from the group consisting of hydrochloric acid, sulfuric acid, acetic acid, propionic acid, and phosphoric acid; and
(iii) adjusting the pH of the resulting emulsion to 7 or higher.

2. A method of treating an inorganic base material comprising applying to the inorganic base material an emulsion prepared according to the method of claim 1.

3. An emulsion prepared according to the method of claim 1.

4. A method of preparing an organic silicone compound emulsion comprising:
   (i) mixing:
      (A) 100 parts by weight of an organoalkoxysilane of the formula $R^1_a Si(OR^2)_{4-a}$ where $R^1$ is an identical or different monovalent hydrocarbon group having 1–20 carbon atoms, $R^2$ is an alkyl group having 1–3 carbon atoms, and a is 1 or 2;
      (B) 1–200 parts by weight of an organopolysiloxane having in its molecule at least two alkoxy groups or hydroxyl groups bonded to silicon atoms;
      (C) an anionic emulsifying agent; and
      (D) water; and
   (ii) adding 0.01 to 5 parts by weight per 100 parts by weight of component (A) of an acid to the emulsion and hydrolyzing the organoalkoxysilane (A); the acid being selected from the group consisting of hydrochloric acid, sulfuric acid, acetic acid, propionic acid, and phosphoric acid;
   (iii) emulsifying the mixture; and
   (iv) adding a pH adjuster to adjust the pH of the resulting emulsion to 7 or higher.

5. A method of treating an inorganic base material comprising applying to the inorganic base material an emulsion prepared according to the method of claim 4.

6. An emulsion prepared according to the method of claim 4.

* * * * *